Figure 1:
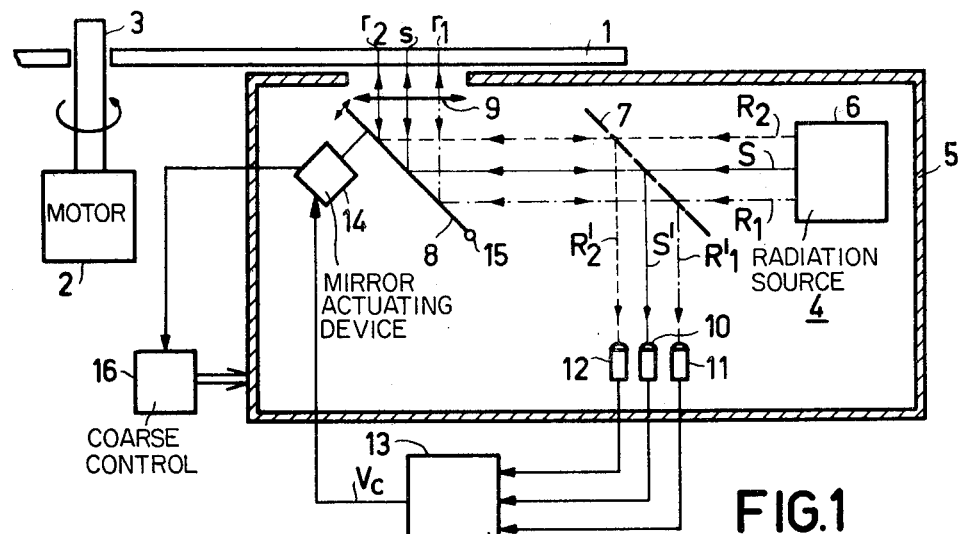

United States Patent [19]
Van Dijk

[11] 4,446,545
[45] May 1, 1984

[54] APPARATUS FOR READING A DISK-SHAPED RECORD CARRIER

[75] Inventor: Ate Van Dijk, Eindhoven, Netherlands

[73] Assignee: U.S. Philips Corporation, New York, N.Y.

[21] Appl. No.: 365,716

[22] Filed: Apr. 5, 1982

[30] Foreign Application Priority Data

Jan. 21, 1982 [NL] Netherlands ................ 8200208

[51] Int. Cl.³ .................... G11B 7/00; G11B 21/10
[52] U.S. Cl. .................................. 369/44; 369/46; 250/202
[58] Field of Search ............... 360/77; 358/342; 369/32, 33, 43, 44, 45, 46, 111, 120, 124; 250/201, 202, 204, 206, 555, 578, 234; 365/234

[56] References Cited

U.S. PATENT DOCUMENTS

| | | | |
|---|---|---|---|
| Re. 29,963 | 4/1979 | Janssen | 369/46 X |
| 4,001,494 | 1/1977 | Adler et al. | 369/46 |
| 4,037,252 | 7/1977 | Janssen | 369/46 |
| 4,236,232 | 11/1980 | Jansen et al. | 369/33 X |
| 4,359,635 | 11/1982 | Gross | 250/201 |

FOREIGN PATENT DOCUMENTS

| | | | |
|---|---|---|---|
| 20904 | 2/1978 | Japan | 369/46 |
| 2037460 | 7/1980 | United Kingdom | 369/46 |

*Primary Examiner*—Aristotelis M. Psitos
*Attorney, Agent, or Firm*—Thomas A. Briody; Robert T. Mayer; Algy Tamoshunas

[57] ABSTRACT

An optical read system for a disk-shaped record carrier. By means of a tracking system the read spot is centerd at the information track. The control signal for this tracking system is obtained by means of additional radiation spots which are disposed on radially opposite sides of the read spot. By subjecting the detection signals corresponding to these additional radiation spots and the read spot to a special operation a control signal is obtained which is highly independent of variations in disk parameters, variations in the intensity of the radiation beams and focussing errors.

4 Claims, 8 Drawing Figures

APPARATUS FOR READING A DISK-SHAPED RECORD CARRIER

The invention relates to an apparatus for reading a disk-shaped record carrier having substantially concentric information tracks, which apparatus comprises an optical system for producing three radiation beams and projecting said radiation beams onto the record carrier as a first, second and third radiation spot, the second and third radiation spot being disposed on opposite sides of the first radiation spot in a direction transverse to the track direction and the distance between their respective centres and the axis which extends through the centre of the first radiation spot and parallel to the information tracks being at least substantially ¼ of the track pitch of the information tracks, a first, second and third detector for detecting the amount of luminous energy in the emerging radiation beams corresponding to the first, the second and the third radiation spot, respectively and for converting this luminous energy into corresponding electric output signals, a tracking system, which co-operates with the radiation beams, for centring the first radiation spot at an information track, and a control device coupled to the second and the third detector, for generating a tracking-system control signal which depends on the difference between the output signals of the second and the third detector.

Such an apparatus is known from U.S. Pat. No. 3,876,842. In the read apparatus for an optical record carrier described in this U.S. patent the output signals of the second and the third detector are subtracted from each other in order to obtain a radial control signal which by controlling the tracking system centres the first radiation spot at the information track.

The generation of the radial control signal is based on the fact that the average luminous intensity of an emergent radiation beam depends on the position of the radiation spot relative to an information track, specifically whether or not this radiation spot coincides with an information track. Since the second and the third radiation spot, viewed in radial direction, are situated at equal distances from the first radiation spot, the output signals of the second and the third detector will be equal if the first radiation spot is centred at an information track. However, if the spot is off-centre, the output signals of the second and the third detector will be unequal and the difference signal may be used for driving the tracking system so as to obtain the desired centring.

A disadvantage of the system described in said U.S. patent is that the magnitude of the resulting control signal depends not only on the centring error of the first radiation spot relative to the information track but also on a large number of parameters both of the read apparatus itself and of the record carrier. In other words, the slope of the control signal around the desired control point is not well-defined but may vary depending on a number of system parameters which are subject to variations.

These parameters are mainly the following:
(a) the intensity of the radiation beams,
(b) the transmission coefficient of the record carrier material or in the case of reflection-mode reading the reflection coefficient of the reflecting layer,
(c) the shape of the information areas in the information track,
(d) focussing errors of the radiation spots relative to the plane of the information track,
(e) the track pitch of the information tracks.

As all these parameters exhibit a substantial spread this means that the magnitude of the resulting control signal as a function of the tracking error may exhibit a substantial variation. This corresponds to a substantial variation of the gain factor in the radial servo-loop. However, this impairs an effective operation of the servo-control loop. In a servo-control loop the transfer characteristic for the relevant control function is optimized by means of frequency-dependent networks. However, if allowance is to be made for a strongly varying gain factor this imposes restraints on the overall transfer characteristic. If the overall transfer characteristic is laid down for one specific gain factor the control loop is likely to become unstable for deviating gain factors.

It is an object of the invention to provide a read apparatus for disk-shaped record carriers in which the generated radial control signal is highly independent of the said parameters.

To this end the invention is characterized in that the control device is also coupled to the first detector and is adapted to supply a control signal $V_c$ which complies with the formula $$V_c = \frac{V_{R1} - V_{R2}}{V_{R1} + V_{R2} - \alpha V_S} \cdot V_{ref}$$

where $V_S$, $V_{R1}$ and $V_{R2}$ are the output signals of the first, the second and the third detector respectively, $\alpha$ is an adjustment factor, and $V_{ref}$ is a reference signal.

As a result of the specified combination of the various output signals of the three detectors the control signal $V_c$ thus obtained is highly independent of said parameters. This means that the transfer function of the radial servo-control loop can be optimized without the risk of instabilities.

A first embodiment of the apparatus in accordance with the invention is characterized in that the control device comprises a first difference-forming stage for determining the difference between the output signals of the second and the third detector, a second difference-forming stage for determining the difference between the sum of the output signals of the second and the third detector and the output signal of the first detector, and a divider stage for determining the quotient of the output signals of the first and the second difference-forming stage and supplying a control signal which corresponds thereto, whilst a special embodiment is characterized in that between the second difference-forming stage and the divider stage there is arranged an amplifier for subjecting the output signal of said second difference-forming stage to a modulus operation. As a result of this modulus operation the divider stage may be simplified. Moreover, it is achieved that the control signal obtained in the case of a movement transversely across the information tracks varies continuously, especially when the magnitude of the control signal is limited.

Figures 2, 4:
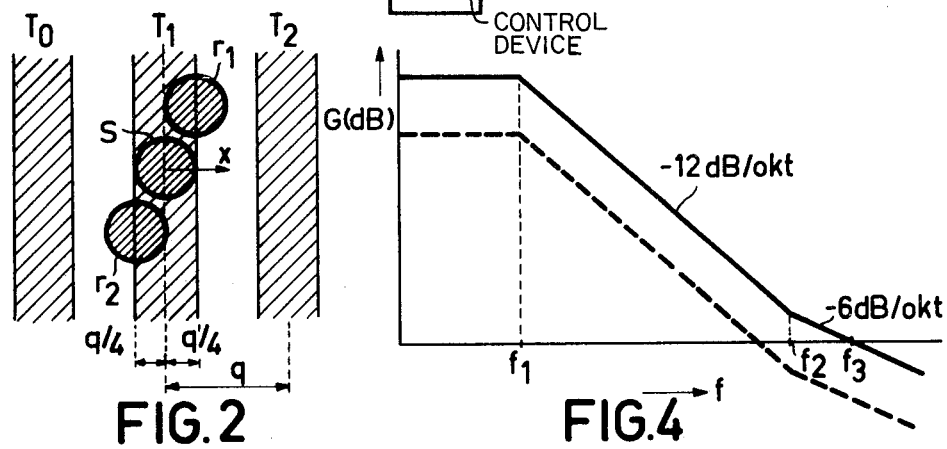
Figure 3:
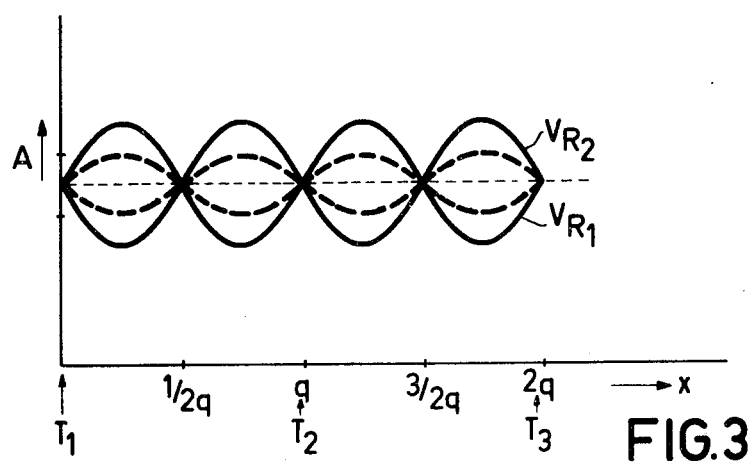
Figure 5:
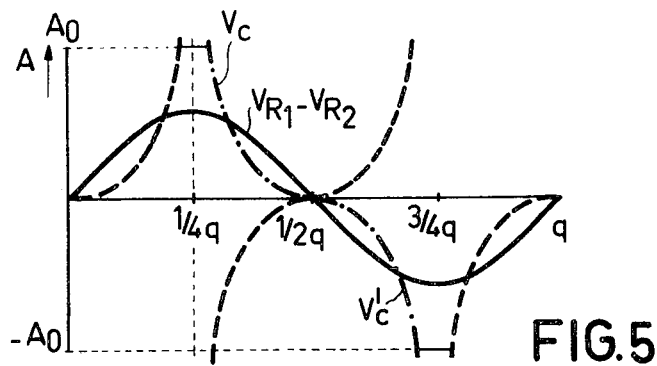
Figure 6:
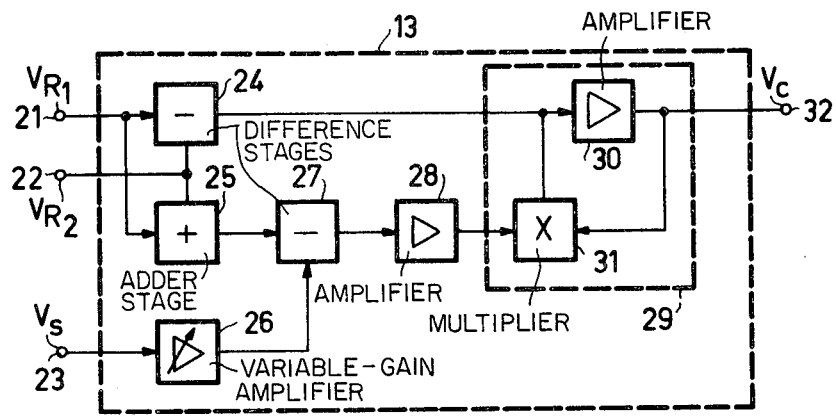
Figure 8:
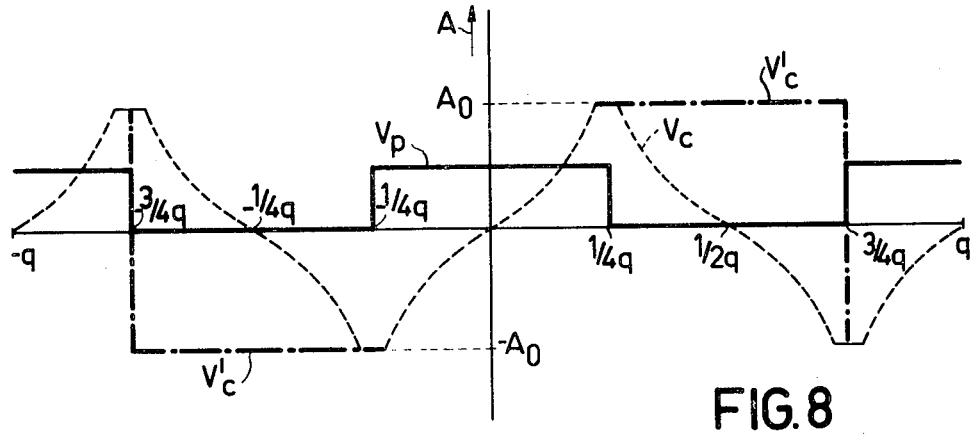
Figure 7:
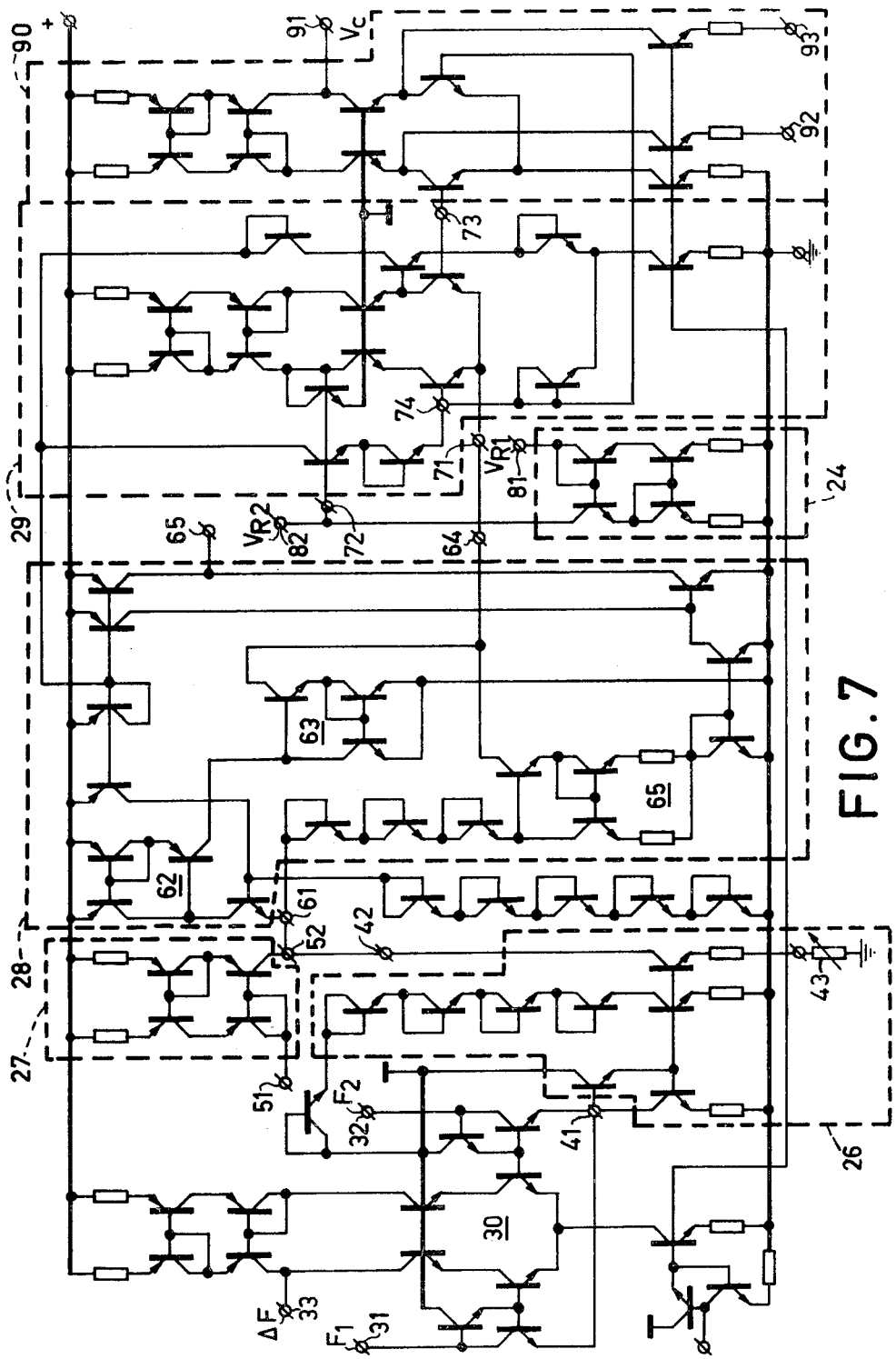

The invention will now be described in more detail, by way of example, with reference to the Figures, in which FIG. 1 schematically represents an embodiment of the read apparatus in accordance with the invention, FIG. 2 shows the position of the radiation spots on the record carrier, FIG. 3 represents the variation of the output signals of the detectors in the case of a displacement transverse to the track direction, FIG. 4 is an example of a frequency characteristic of a radial servo-system, FIG. 5 represents the variation of the control signal obtained by means of the apparatus in accordance with the invention, FIG. 6 is the block diagram of a version of the control device used in the apparatus in accordance with the invention, FIG. 7 shows a detailed circuit diagram of this control device, and FIG. 8 is a variant to the resulting control signal $V_c$.

In FIG. 1 the reference numeral 1 denotes a disk-shaped record carrier comprising a multitude of concentric or quasi-concentric (spiral) information tracks. The information may be recorded in these information tracks in various known manners. As an example, reference is made to U.S. Pat. No. 4,160,269, where the information tracks comprise areas and intermediate areas whose different lengths represent the information. These areas and intermediate areas influence a radiation beam projected onto the information track in different manners, so that this radiation beam is modulated depending on the information stored. As an example, the transmission or reflection coefficient of the areas may differ from that of the intermediate areas, so that a read beam is amplitude-modulated. It is alternatively possible to arrange the areas and intermediate areas at different levels in the record carrier, so that the read beam is phase-modulated, which modulation may be converted into an amplitude modulation by suitable means. Since the method of modulation and the method of information-recording is of minor importance to the present invention it will not be described in more detail. In the present example it is assumed that the record carrier 1 has a reflecting information structure on the upper side.

This record carrier 1 is rotated by a motor 2 via a spindle 3 which co-operates with a central opening in said record carrier. For reading the record carrier 1 there is provided an optical system 4, which is accommodated in a housing 5. This optical system 4 comprises a radiation source 6 which emits three radiation beams S, $R_1$ and $R_2$. These three radiation beams are together projected onto the record carrier 1 as radiation spots s, $r_1$ and $r_2$ via a semi-transparent mirror 7, a pivotal mirror 8 and a lens 9. The radiation beams $S'$, $R_1'$ and $R_2'$ reflected from the record carrier are reflected to the detectors 10, 11 and 12 by the mirror 8 and the semi-transparent mirror 7. These detectors 10, 11 and 12 each supply an output signal on their outputs, which output signals represent the luminous intensities of the radiation beams $S'$, $R_1'$ and $R_2'$ which have been modulated by the record carrier.

These output signals of the detectors 10, 11 and 12 are applied to a control device 13, which derives from these signals a control signal $V_c$ for radially positioning the radiation spots s, $r_1$ and $r_2$ projected onto the record carrier by the radiation beams S, $R_1$ and $R_2$. In order to obtain this radial positioning said control signal $V_c$ is applied to an actuating device 14 by means of which the mirror 8 can be pivoted about an axis 15. This actuating device 14 may for example be an electro-magnetic actuator controlled by a control current. Furthermore, it is possible to derive a control signal from the average position of the mirror 8 for a coarse control means 16 by which the housing 5 can be moved in a radial direction.

FIG. 2 shows how the radiation spots s, $r_1$ and $r_2$ are positioned relative to each other and relative to the information tracks on the record carrier. Viewed in the radial direction x, the radiation spots $r_1$ and $r_2$ are situated on opposite sides of the scanning spot 5 at a distance q/4 from this scanning spot 5, q being the track pitch, i.e. the distance between the centres of adjacent information tracks ($T_1$, $T_2$).

This pattern of radiation spots has been chosen because the two radiation beams $R_1'$ and $R_2'$ corresponding to the radiation spots $r_1$ and $r_2$ have the same average luminous intensities when the radiation spot 5 is exactly centred at an information track. If the radiation spot s is not correctly centred the average luminous intensities of the reflected radiation beams $R_1'$ and $R_2'$ are different. Here the term "average" denotes that variations in luminous intensity caused by the high-frequency information structure in the information track are ignored. In fact, these high-frequency variations are removed by means of low-pass filters when deriving the radial control signal.

FIG. 3 illustrates the variation of the average intensities A of the radiation beams $R_1'$ and $R_2'$ as a function of the position of the radiaton spot s relative to the information tracks. This shows that the difference between these luminous intensities, i.e. the difference between the output signals of the detectors 11 and 12, representative of the direction and the magnitude of the radial tracking error. This difference signal may consequently be employed as control signal for the tracking system 14, by which the radiation spot s is kept centred at the information track. Therefore, this radiation spot s may be used as read spot and is modulated by the information stored in the information track. Consequently, the output of the detector 10 will supply the information signal and is connected to an information-processing unit. Since this information-processing unit is irrelevant to the present invention it is not represented in FIG. 2.

When the radial control signal is generated in this way this gives the problem that the control signal depends on a number of parameters which are subject to spread. For example, the magnitude of the resulting control signal depends on the shape of the information areas in the information track. This shape, for example the depth and/or width of the pits in an information track formed as a high-low-structure, determines the average luminous intensity of the reflected radiation beam when the radiation spot coincides with the information track. As a result of this, the amplitude of the intensity variation $V_{R1}$, $V_{R2}$ of the radiation beams during a movement across the tracks depends on the shape of the information areas. As is indicated by the broken line in FIG. 2, the magnitude of the control signal $V_{R1} - V_{R2}$ thus obtained depends on this amplitude and thus on the shape of the information areas.

A similar variation of the resulting control signal occurs if the focussing of the radiation spots at the information structure is not entirely correct. Normally, the focussing of the radiation beams at the information surface of the record carrier is optimized by means of a focussing control by which the lens 9 is positioned in the direction of the record carrier and by means of which a compensation is provided for out-of-flatnesses of the record carrier. Depending on the flatness of the record carrier, however, residual errors in this focussing persist, so that the diameters of the radiation spots s, $r_1$ and $r_2$ remain subject to certain variations. These variations of the diameters of the radiation spots, in turn, cause variations in the amplitudes of the luminous intensities $V_{R1}$ and $V_{R2}$ as is indicated in FIG. 3, i.e. variations in the resulting control signal.

In the case of a variation of the track pitch the steepness of the control signal will vary inversely proportionally to said track pitch. The period of the control signal is directly proportional to the track pitch, so that the steepness is inversely proportional thereto.

Variations in the magnitude of the generated control signal restrain the optimization of the radial servo-control loop, as will be demonstrated with reference to FIG. 4. This Figure, by way of example, represents the frequency characteristic of the open-loop gain G of a radial servo-control loop. This characteristic is flat up to a frequency f1. For these low frequencies a very high gain is required because this determines the accuracy of the control system. From the frequency f1 to f2 the frequency characteristic rolls off comparatively steeply (for example 12 dB/oct.), because in general the influence of high frequencies, for example caused by imperfections in the record carrier, on the control loop is to be avoided. However, in order to ensure that the closed control loop remains stable, the roll-off of the characteristic at the point of intersection with the B axis where the gain factor G is 0 dB should not exceed −6 dB/oct., correction networks ensuring a roll-off of −6 dB/oct. of the characteristic starting from the frequency f2.

However, if the magnitude of the control signal now varies as a result of a variation of the modulation depth or focussing errors, which means a variation of the open-loop gain G, the frequency characteristic is vertically shifted. If this results in the characteristic represented by the broken line, the servo-control loop will become unstable because the slope will then be −12 dB/oct. in the point of intersection with the 0 dB-axis.

Therefore, the frequency characteristic as a function of the open-loop gain should be selected so as to allow for a possible shift or this characteristic, so that the characteristic can no longer be optimized.

In accordance with the present invention the generated radial control signal is rendered substantially independent of the said parameters, so that once a frequency characteristic has been selected it is well-defined and is no longer subject to shifting. This means that this frequency characteristic can be optimized, which may provide a substantial improvement of the control behaviour of the radial servo-control loop.

In accordance with the invention the output signal $V_s$ of the detector 11 is used, in addition to the two output signals $V_{R1}$ and $V_{R2}$ of the detectors 11 and 12, for deriving the control signal $V_c$. Specifically, a control signal $V_c$ is generated which complies with the formula:

$$V_c = \frac{V_{R1} - V_{R2}}{V_{R1} + V_{R2} - \alpha V_s} \cdot V_{ref} \qquad (1)$$

where $\alpha$ is an adjustment factor and $V_{ref}$ is a reference signal.

In order to demonstrate the effect of this step, the variation of the output signals $V_{R1}$ and $V_{R2}$ of the detectors 11 and 12 may be expressed by the formuling formula:

$$V_{R1} = H\left(1 + m \sin 2\pi \frac{x}{q}\right) \qquad (2)$$

$$V_{R2} = H\left(1 - m \sin 2\pi \frac{x}{q}\right)$$

Here, H is the luminous intensity of each of the radiation beams $R_1$ and $R_2$ projected at the record carrier, and m the modulation depth, which depends on the focussing and the shape of the information track.

The output signal $V_s$ of the detector 10 then satisfies the formula:

$$V_s = \beta H\left(1 - m \cos 2\pi \frac{x}{q}\right) \qquad (3)$$

where $\beta H$ is the luminous intensity of the radiation beam S, which generally differs from that of the radiation beams $R_1$ and $R_2$.

Inserting formulas (2) and (3) in (1) yields:

$$V_c = \frac{2Hm \sin 2\pi \frac{x}{q}}{2H - \alpha\left(\beta H - Hm \cos 2\pi \frac{x}{q}\right)} V_{ref} \qquad (4)$$

If with the aid of an adjustment facility in the control device it is ensured that $\alpha\beta = 2$, this formula is reduced to:

$$V_c = \frac{\sin 2\pi \frac{x}{q}}{\cos 2\pi \frac{x}{q}} \cdot V_{ref} = \tan 2\pi \frac{x}{q} \cdot V_{ref} \qquad (5)$$

This shows that the undesired parameter m has been eliminated completely. Furthermore, it can be seen that the shape of the control signal $V_c$ as a function of x (see FIG. 5) is no longer sinusoidal as in the case of $V_{R1} - V_{R2}$ (see FIG. 5), but tangential, as is represented by the broken line in FIG. 5. It is obvious that the shape of the ultimate control signal may be adapted to specific requirements by further electronic processing.

By means of a hyperbolic-tangent operation the tangential shape may be converted into a straight line, so that a saw-tooth characteristic with a period of $\frac{1}{2}q$ is obtained. Instead of this sawtooth characteristic it is also possible to generate a sawtooth characteristic having a period q by shifting the first-mentioned sawtooth within specific quadrants of the range $0 < x < q$. Alternatively, the sawtooth characteristic may be converted into a triangular characteristic. Of course, this is of minor importance for the present invention, the unambiguity of the resulting control signal $V_c$ in fact permitting the application of such operations without any risk.

Further, it has been found that the dependence of the control signal on track-pitch variations has been reduced substantially. This is because the signal processing in accordance with formula 1 introduces an approximately directly proportional dependence on the track pitch, which at least partly compensates for the previously stated inversely proportional dependence.

FIG. 6 schematically represents an example of the control device 13 for generating the desired control signal $V_c$. The control device 13 comprises three input terminals 21, 22 and 23 for receiving the output signals $V_S$, $V_{R1}$ and $V_{R2}$ from the detectors 10, 11 and 12. The two signals $V_{R1}$ and $V_{R2}$ are subtracted from each other in a difference-forming stage 24. Moreover, these two signals are added to each other in an adder stage 25. The signal $V_s$ is applied to a variable-gain amplifier 26 which serves to define the factor $\alpha$ in formula 4. The resulting sum signal $V_{R2}+V_{R2}$ and the output signal $\alpha V_s$ of the amplifier 26 are subsequently subtracted from each other in a difference-forming stage 27, after which the resulting difference signal is again amplified by means of an amplifier 28. This amplified signal from the amplifier 28 and the output signal of the difference-forming stage 24 are finally applied to a divider stage 29, which produces a control signal $V_c$ on an output terminal 32. In the present example this divider stage comprises an amplifier 30 with a feedback circuit comprising a multiplier 31.

Hereinafter two further possibilities are given. If the multiplier is a four-quadrant multiplier a control signal $V_c$ is obtained whose variation as a function of x is as represented by the broken line in FIG. 5. However, it is alternatively possible to employ a two-quadrant multiplier. In that case the amplifier 28 should be designed so that its output signal corresponds to the modulus of its input signal. This version supplies a control signal $V_c'$ whose variation as a function of x entirely corresponds to the variation of $V_c$ in the relevant quadrants $0 < x < \frac{1}{4}q$ and $\frac{3}{4}q < x < q$, but is inverted in the other two quadrants $\frac{1}{4}q < x < \frac{3}{4}q$ (see FIG. 5 dash-dot line). By limiting the magnitude of the control signal $V_c'$ in this version to a specific value $A_o$, again a continuous variation as a function of x is obtained as shown in FIG. 5, which only differs from the variation of the control signal $V_{R1} - V_{R2}$ are regards its shape.

Finally, FIG. 7 represents the control device 13 shown in FIG. 6 in detail. This control device also generates a control signal for focussing control, which is based on the so-called astigmatic focussing as for example described in Netherlands Patent Application 7,703,076. In order to obtain a focussing-error signal by means of this method the detector 10 (FIG. 1) for the radiation spot 5 is split into a plurality of sub-detectors. By a suitable combination of the output signals of these sub-detectors two signals $F_1$ and $F_2$ can be obtained whose difference represents the focussing error.

In the control device shown in FIG. 7 these two signals $F_1$ and $F_2$, which are available as detector currents, are applied to the two inputs 31 and 32 of a differential amplifier 30. The difference signal $\Delta F$ is then available on the output 33 of this differential amplifier 30 for further processing in the focussing servo-control loop.

The sum of the two signals $F_1$ and $F_2$, which sum corresponds to the signal $V_s$ shown in FIG. 6, is applied to the input 41 of the amplifier 26, which is arranged a current-mirror circuit and on whose output 42 the amplified signal current is available. This current mirror circuit comprises a variable resistor 43 for adjusting the gain factor between the input and the output, which gain factor determines the factor $\alpha$ in formula (1).

The difference-forming stage 27 is also formed by a current-mirror circuit comprising an input 51 and an output 52. The sum of the output signals of the two detectors 11 and 12 is then applied to the input 51, so that first the sum of these two signals must be formed. However, a simpler solution is also possible. The detectors 10, 11 and 12 are generally integrated on one substrate and their respective detector currents are available on the relevant outputs. However, the substrate also carries a current which corresponds to the sum of all detector currents and thus corresponds to $V_{R1}+V_{R2}+V_s$. By feeding the substrate current to the input 51 of the current mirror 27 a separate adder circuit 25 (FIG. 6) may be dispensed with, whilst the additional term $V_s$ may be eliminated by adapting the gain factor of the amplifier 26.

The output 52 of the current mirror 27 is connected to the output of the current mirror 26, so that the two output currents of the current mirrors are subtracted from each other and the difference signal $V_{R1}+V_{R2}-\alpha V_s$ is available on the output 52 as the difference current.

This difference current is applied to the input 61 of the amplifier 28. This amplifier 28 also performs a modulus operation. An input current of negative polarity on the input 61 is passed through two current mirrors, namely the mirrors 62 and 63 and hence is available on the output 64 as an output current of negative polarity. An input current of positive polarity on the input 61, however, is passed through one current mirror only, namely the current mirror 65, and is consequently also available on the output 64 as an output current of negative polarity.

This output current is applied to an input 71 of the divider stage 29. The second signal for this divider stage on input 72 is obtained from the difference-forming stage 24, which is formed by a current mirror, whose two inputs 81 and 82 receive the detector signals $V_{R1}$ and $V_{R2}$. The quotient which is available on the outputs 73 and 74 of the divider stage as the difference signal is once more amplified in an amplifier stage 90 and is finally available on an output terminal 91 as the control signal $V_c$. This amplifier stage 90 comprises two further inputs 92 and 93 to which reference signals may be applied for correcting an offset in the circuit.

Finally, the circuit arrangement shown in FIG. 7 comprises an output terminal 65 which is coupled to the modulus amplifier 28. This output 65 supplies a squarewave output signal $V_p$, which has a first value for $0<x<\frac{1}{4}q$ and $\frac{3}{4}q<x<q$, and a second value for $\frac{1}{4}q<x<\frac{3}{4}q$, as is shown in FIG. 8. FIG. 8 also represents the variation of the central signal $V_c$ available on the output 91. The squarewave signal $V_p$ may be used for modifying the control signal $V_c$ in order to obtain an even more reliable centering. As is apparent from the shape of $V_c$, the control range is in fact limited to $-\frac{1}{4}q<x<q$. If the tracking error increases further, for example as a result of a fault condition, the control signal for $x>\frac{1}{4}q$ suddenly decreases at increasing x. In that case, also as a result of possible phase inversions upon passage of the limit $x=\frac{1}{4}q$, the control system may no longer be capable of rapidly enough returning the read spot to the desired track $x=0$ but moves this spot to the next track ($x=q$).

Since at this very limit $x=\frac{1}{4}q$ the squarewave signal $V_p$ becomes zero, this signal may be used for modifying the control signal in order to improve the stability. Specifically, this signal $V_p$ may actuate a hold circuit which upon passage of $x=\frac{1}{4}q$, holds the control signal $V_c$ at the value $A_o$ as long as this signal $V_p$ is zero. In the same way the control signal $V_c$ is held at the value $-A_o$ upon passage of $x=-\frac{1}{4}q$. For centring at the track $x=0$ this yields a control signal $V_o'$ which for $-\frac{1}{4}q<x<\frac{1}{4}q$ corresponds to the control signal $V_c$. For $\frac{1}{4}q<x<\frac{3}{4}q$ this control signal $V_c'$ has the value Ao, for $-\frac{3}{4}q<x<-\frac{1}{4}q$ the value $-Ao$, whilst for $x<-\frac{3}{4}q$ and $x>\frac{3}{4}q$ the signal $V_o'$ is again equal to $V_c$. As is apparent from the Figure the hold range of the control system is substantially extended by this step, so that the read spot will remain centred at the desired track with a high degree of certainty.

It will be evident that the present invention is not limited to the embodiments shown in the Figures. Depending on the choice of the optical system modifications may be applied both as regards the system and the circuit design.

What is claimed is:

1. An apparatus for reading a disk-shaped record carrier having substantially concentric information tracks, which apparatus comprises an optical system for producing three radiation beams and projecting said radiation beams onto the record carrier as a first, second and third radiation spot, the second and third radiation spot being disposed on opposite sides of the first radiation spot in a direction transverse to the track direction and the distance between their respective centres and the axis which extends through the centre of the first radiation spot and parallel to the information tracks being at least substantially $\frac{1}{4}$ of the track pitch of the information tracks, a first, second and third detector for detecting the amount of luminous energy in the emerging radiation beams corresponding to the first, the second and the third radiation spot respectively and for converting this luminous energy into corresponding electric output signals, a tracking system, which co-operates with the radiation beams, for centring the first radiation spot at an information track, and a control device, coupled to the second and the third detector, for generating a tracking-system control signal which depends on the difference between the output signals of the second and the third detector, characterized in that the control device is also coupled to the first detector and is adapted to supply a control signal $V_c$ which complies with the formula:

$$V_c = \frac{V_{R1} - V_{R2}}{V_{R1} + V_{R2} - \alpha V_s} \cdot V_{ref}$$

where $V_s$, $V_{R1}$ and $V_{R2}$ are the output signals of the first, the second and the third detector respectively, $\alpha$ is an adjustment factor, and $V_{ref}$ is a reference signal.

2. An apparatus as claimed in claim 1, characterized in that the control device comprises
   a first difference-forming stage for determining the difference between the output signals of the second and the third detector,
   a second difference-forming stage for determining the difference between the sum of the output signals of the second and third detector and the output signal of the first detector, and
   a divider stage for determining the quotient of the output signals of the first and the second difference-forming stage and supplying a control signal which corresponds thereto.

3. An apparatus as claimed in claim 2, characterized in that between the second difference-forming stage and the divider stage there is arranged an amplifier for subjecting the output signal of said second difference-forming stage to a modulus operation.

4. An apparatus as claimed in claim 2, characterized in that the second difference-forming stage receives a first input signal which is proportional to the sum of the output signals of the first, second and third detector.

* * * * *